Patented May 4, 1954

2,677,795

UNITED STATES PATENT OFFICE 2,677,795

MECHANICALLY INTERLOCKED CIRCUITS FOR ALTERNATELY STEPPING REVERSIBLE MOTORS

Charles W. Nielsen, Eagle, Wis., assignor to Allis-Chalmers Manufacturing Company, Milwaukee, Wis.

Application February 19, 1953, Serial No. 337,733

10 Claims. (Cl. 318—65)

This invention relates in general to control systems for motors and particularly to such systems in which interconnected motor circuits are adapted to operate several voltage regulators in steps.

An application of such a system is an electrical interlock circuit for the motors of a plurality of step type feeder voltage regulators that are to be kept in step so that the regulators supply voltages differing by less than a predetermined value where the regulators are connected in parallel to supply a common load. Relatively complicated circuits have been suggested for controlling the step by step operation of motors of voltage regulators connected in parallel. And these systems and circuits previously suggested have involved the utilization of relays that inherently result in contact troubles. The failure of even one relay to operate may cause the regulators to move apart to their maximum limit resulting in serious overvoltage or undervoltage of the load circuit, damaging motors, lamp bulbs, etc. Furthermore, in certain areas the atmospheric conditions considerably increase the likelihood of these troubles. Therefore, it is highly desirable that the voltage regulator motor circuits be operated without the utilization of any relays.

Other disadvantages of suggested systems of voltage regulators or more particularly the motor control systems of those regulators are that the control circuits for the separate regulator motors may not each be easily independently connected to an electrical source for individual operation; that is, in some systems, one regulator, the motor of which is connected to a main source of electrical energy, must always be the first to operate and then the motors of the other regulators are so arranged to be subservient to the first so that they must operate in response to the movement of the first regulator. Thus, it is difficult to change those systems so that any one or all of the units may operate individually. The changes that, in such instance, would have to be made in the regulator motor circuits are considerable, whereas easy adaptability of the regulators to individual operation is also desired.

Other disadvantages of the suggested systems of operating motors of voltage regulators in parallel are that when a condition change is called for, the motors of the first regulator and of each subservient regulator must move before the regulation step is completed, thereby changing taps of every voltage regulator in the parallel system whether or not the tap change on each unit is necessary to correct the load voltage. This is a particular disadvantage in instances in which the paralleled regulators supply very closely controlled voltage to electrical furnaces in which instances the reactance of the transformers associated with the regulators may be such that a predetermined limited voltage difference between regulators may be tolerated.

The disadvantages of the previously suggested control systems for interlocking motors adapted to parallel connected voltage regulators are avoided in circuits connected in accordance with the teachings of this invention. Preferably, the interlock motor control system embodying the teaching of this invention does not necessitate utilization therein of any relays other than a condition responsive device such as a contact making voltmeter. The motor of each voltage regulator may have its own independent energizing circuit so that each regulator may be easily connected separately to a source whereby any regulator of the system may be isolated and operated independently of the others.

In accordance with this system a minimum number of mechanically operated positively driven position switches are directly associated with each of the motors and are interconnected in the several motor energizing circuits to prevent operation of any one regulator motor through two successive operational steps until and unless all the other regulator motors of the system have completed a similar operational change of their respective associated regulators. And in which system the condition responsive means for energizing the motor circuits, for example, a contact making voltmeter, may be so disposed in its relation to or association with the interconnected motor circuits that when a voltage change is called for, only that number of units will be moved that are necessary to correct the variation of condition to which the condition responsive device responds. When that load voltage or condition is corrected, therefore, the voltage regulator motor circuits may be interrupted so that other units in the parallel system will not be moved unnecessarily.

It is therefore an object of the present invention to provide an improved control circuit whereby a plurality of regulators connected in parallel to supply a common load, may be kept in step.

Another object of the present invention is to provide an interlocked control system for a plurality of reversible motors which may be alternately operated step by step in either direction and in which no relays are required for the control circuits.

Still another object of this invention is to provide an improved control system to operate a plurality of motors step by step in either of opposite directions in response to certain condition changes keeping those motors within one step of each other at all times, wherein the control circuit for each of the motors may be easily and quickly isolated and operated individually in response to the same condition changes.

Objects and advantages other than those above set forth will be apparent to those skilled in the art from the following description when read in connection with the following drawings in which.

Figure 1:
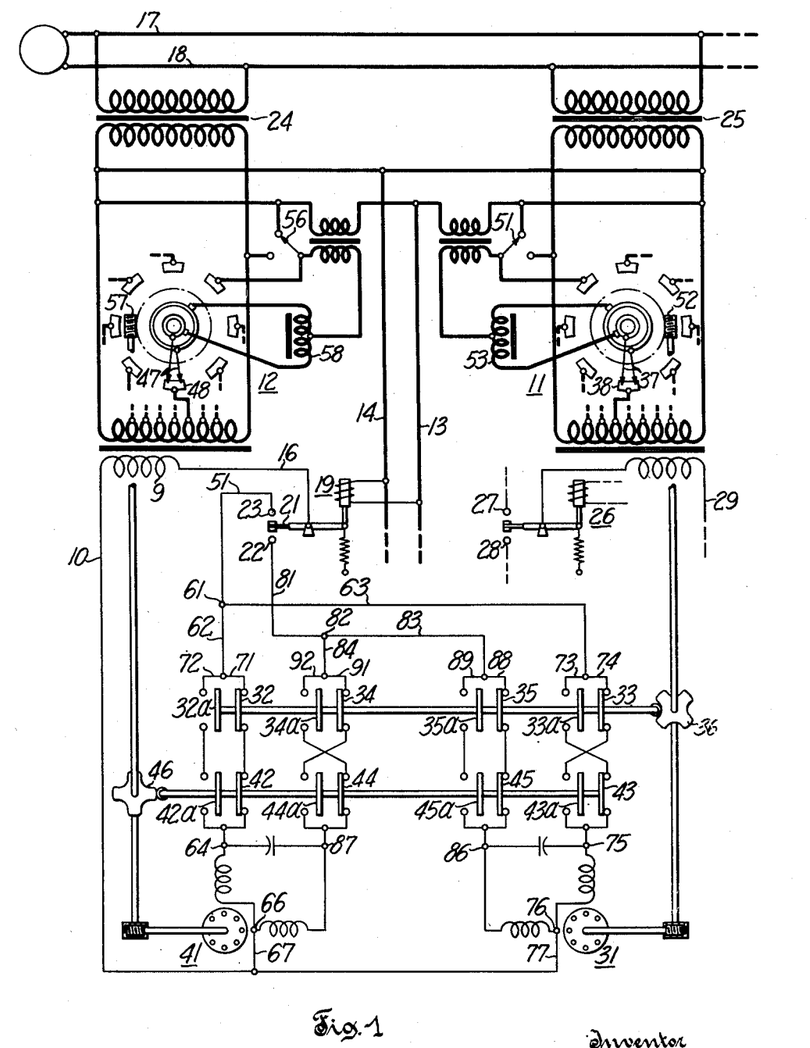
Fig. 1 is a schematic diagram of connections of a control circuit for parallel connected voltage regulators, embodying the present invention.

In the arrangement shown in Fig. 1 two step type transformer tap changing regulators 11 and 12 are interconnected in parallel through associated transformers 24 and 25 to a common load line 13, 14. The illustrated embodiment is a single phase system, but the transformer windings of the regulators could as well be shown in any other circuit where it is desired that the regulators be maintained in like regulating positions, for example, in a polyphase circuit as shown in U. S. Patent 2,512,989, L. C. Aicher, July 27, 1950, Step Regulator Control Systems.

Reversible motors 31 and 41, respectively, drive quick break mechanisms indicated generally by the numerals 52 and 57 of regulators 11 and 12, whereby the movable contacts 37 and 47, respectively, move with rapid snap action from one position to another position, relative to fixed taps 38 and 48 of the windings of the regulators 11 and 12, respectively. Reversing switches 51 and 56 are supplied so as to double the number of available tap connections on each of the regulators. And preventive autotransformers 53 and 58 are utilized to limit the circulating current when either of the movable tap changer contacts 37 or 47 is bridging two adjacent taps 38 and 48 of the associated regulator winding. These regulators which are diagrammatically shown may be of a type illustrated in U. S. Patent 2,177,109, L. H. Hill, October 24, 1939, Voltage Regulators, in which the rapid snap action quick break mechanism is more fully shown.

The two motors are energized by their respective control circuits, each being supplied from an electrical source shown as conductors 10 and 16 connected to winding 9 which may be a winding of the transformer of regulator 12. Both motors are connected to contact making voltmeter 19 to be thereby selectively operated in one direction or in the opposite direction to raise or to lower the load voltage. Contact making voltmeter 19 is energized by the load voltage being connected between lines 13 and 14. When movable contact 21 closes on fixed contact 22, it provides for running the motors in a direction to lower the load voltage, and when movable contact 21 closes on fixed contact 23, it provides for running the motors in the opposite direction to thereby raise the load voltage. Between these two extreme positions the contact making voltmeter is in a neutral position.

Position switches are included in the motor circuits to control the sequential operation of the motors so that the motors will either be on corresponding tap positions of their respective regulators, or at least not more than one tap position apart. These switches, eight for each motor and their mechanically driven linkage constitute motor units. Eight switches, 32, 33, 34, 35, 32a, 33a, 34a and 35a and mechanical means including cam 36 connected by suitable linkage directly to motor 31 constitute one motor unit. On odd steps, motor 31 mechanically closes odd position switches 32 through 35, and on even steps that motor closes even position switches 32a through 35a.

Similarly, motor 41 operates eight switches 42 through 45 and 42a through 45a by mechanical means including cam 46. On odd steps motor 41 closes odd position switches 42 through 45, and on even steps this motor closes the four even position switches 42a through 45a.

Cams 36 and 46 and the tap changing contacts 37 and 47, respectively, are synchronized in their operation so that the odd position switches are closed and the even position switches are open when the tap changer contacts are on the same tap, and the odd position switches are open and the even position switches are closed when the tap changer contacts are in bridging positions across adjacent taps. This is shown diagrammatically in that the cams and the tap changer contacts of each motor are driven by common shafts connected to their respective associated motors.

The circuits for reversibly operating both motors includes the contact making voltmeter which is connected to line 16 of the source 9 of electrical energy. In the circuit for operating the motors to raise the voltage of the load, one end of conductor 51 is connected to contact 23 of the contact making voltmeter, and the other end of that conductor is connected at 61 to two circuit means 62 and 63, which are provided for energizing the motors 41 and 31, respectively, in the "raise" direction. Circuit means 62 is connected at 64 to a first terminal of motor 41 and includes a main branch circuit 71 and an alternate branch circuit 72, each of which has in series circuit relation a position switch of similar kind associated with each of the motors. Branch 71 has in series odd position switches, switch 32 associated with motor 31 and switch 42 associated with motor 41; while branch 72 has in series even position switches, switch 32a associated with motor 31 and switch 42a associated with motor 41. A second terminal 66 of motor 41 is connected by conductor 67 to line 16 of the electrical source. Circuit means 63 is connected at 75 to a first terminal of motor 31, and between points 61 and 75, this circuit means also has alternate branch circuits, 73 and 74. Each of these branch circuits has an even position switch of one motor in series with an odd position switch of the other motor. Branch 73 has in series even position switch 33a and odd position switch 43; while branch 74 has in series odd position switch 33 and even position switch 43a.

Numeral 76 designates a second terminal of motor 31 to which one end of conductor 77 is connected, the other end of this conductor being connected to line 16.

The circuits to energize the motors to operate them in their opposite direction, that is "lower" direction, are generally similar to those described above. One end of conductor 81 is connected to contact 22 of the contact making voltmeter, and the other end of conductor 81 is connected at 82 to two circuit means 83 and 84. Circuit means 83 connects at 86 to a third terminal of motor 31; whereas, circuit means 84 connects at 87 to a third terminal of motor 41. Alternate branch circuits are connected between points 82 and 86 of circuit means 83 and between points 82 and 87 of circuit means 84, branches 88 and 89 being in circuit means 83 and branches 91 and 92 being in circuit means 84.

Branches 88 and 89 each has in series a position switch of like kind associated with the motors. Branch 88 has in series odd position switches 35 and 45; while branch 89 has in series even position switches 35a and 45a. Circuit means 83 and branch circuits 88 and 89 are provided to energize motor 31 through terminal 86 when both motors are on the same step.

Branches 91 and 92 of circuit means 84 each has in series an even position switch of one motor and an odd position switch of the other motor. Branch 91 has in series odd position switch 34 and even position switch 44a; while branch 92 has in series even position switch 34a and odd position switch 44. Circuit means 84 and branch circuits 91 and 92 are provided to energize motor 41 through terminal 87 when one motor is on an odd step and the other on an even step.

In operation of the embodiment shown in Fig. 1, the motors are deenergized when the contact making voltmeter is in its neutral position between the extreme positions of contacts 22 and 23 as shown. In the neutral position, therefore, the contact making voltmeter prevents either the motors being energized because their "raise" and "lower" circuits are open. Contact 21 of the contact making voltmeter closes on contact 23 if the load voltage is low, or on contact 22 if the load voltage is high. Assume next that the load voltage is low, and the contact making voltmeter has responded to call for the regulator to operate in the direction to change taps to increase the voltage supplied to the load circuit. That is, contact 21 is closed on contact 23 in the "raise" circuit means for alternately energizing the two motors. First, with the regulators positioned on odd taps of their windings at what might be said to be with motors on odd steps, a circuit is completed to energize motor 41. This circuit is from source 9 through line 16, movable contact 21, fixed contact 23, conductor 51, point 61, branch circuit 71 of energizing circuit means 62 in which odd position switches 32 and 42 are closed, to terminal 64 of motor 41, through the motor windings and from terminal 66 of motor 41 through conductor 67 to line 18 connected to source 9. Motor 41 is thus operated in a direction to move its associated quick break mechanism 57 of regulator 12 thereby changing the position of the tap changer contacts 47 with respect to the fixed tap 48 to raise the voltage supplied by regulator 12 to the load. Simultaneously, with this tap change, cam 46 mechanically operated by motor 41 and synchronized with the operation of the tap changer opens its associated even position switches and closes its associated odd position switches. Thus one of the series connected odd position switches 42, in branch circuit 71 is opened and motor 41 is deenergized. If this voltage change of the load circuit is not sufficient to return the contact making voltmeter to its neutral position, it is obvious that more voltage change must be made. And because of the reactance of the associated transformers 24 and 25 a predetermined limited voltage difference between the parallel connected regulators is tolerated, but those regulators are not permitted to be more than one tap position apart. And preferably, as illustrated in this embodiment in which the regulator tap changers bridge adjacent taps of their respective windings on odd positions, the difference between the voltages of the two regulators is not permitted to exceed one-half the voltage between adjacent taps of the windings. Therefore, if one tap change of regulator 12 does not result in the contact making voltmeter returning to its neutral position, thereby deenergizing the motors of the regulators, a tap change is made by regulator 11 because branch circuit 74 of energizing circuit means 63 is completed through position switches of unlike kind at the time cam 46 closes even position switch 43a.

Thus as soon as regulator 12 has made its step operation, motor 31 of regulator 11 is energized to similarly operate regulator 11 through one step operation so long as the contact making voltmeter remains closed on contact 23. However, for the preferred type regulators which are disclosed in the above mentioned patent to L. H. Hill there is in effect a time delay between the starting of rotation of the motor and the completion of the tap change of the regulator as such tap changing mechanism includes a quick break mechanism which has a certain windup time before it operates. If during this windup time, the contact making voltmeter returns to its neutral position, a second voltage correction is unnecessary and regulator 11 does not operate as its motor circuits are deenergized by the contact making voltmeter.

Simultaneous with this tap change cam 36 and its associated mechanical linkage driven by motor 31 opens the odd position switches and closes the even position switches of its unit.

Thus, after a tap change of each regulator, both of the alternate branch circuits 73 and 74 of circuit means 63 connected to terminal 75 are opened and motor 31 is deenergized. But branch circuit 72 of circuit means 62 connected to terminal 64 of motor 41 is closed as even position switches 32a and 42a are both closed. Motor 41 is thus energized to operate regulator 12 to effect another tap change unless the contact making voltmeter returns to neutral. Since both regulators may incorporate a certain time delay before the tap change or between the energization of their respective associated motor and a tap change, the contact making voltmeter has plenty of time to open if no further change is required in the load circuit.

Nevertheless, if at any subsequent time an increase in load voltage is called for, contact 21 is closed on contact 23 and motor 41 is energized through alternate branch circuit 72 including in series a closed even position switch of each motor. A tap change by regulator 12 then results, and the associated even position switches are opened and the associated odd position switches are closed so that circuit 63 associated with the "raise" terminal of motor 31 is closed. Then a tap change by regulator 11 results in cam 36 opening the even position switches and closing the odd position switches associated therewith, thereby returning the circuit to the condition illustrated in the diagram of Fig. 1.

The operation of the two regulators to lower the load circuit voltage is substantially identical to that required to raise the load circuit, except that movable contact 21 then is engaged with contact 22 in circuit means 81. When the regulators are both on the same steps, as shown in Fig. 1, motor 31 is energized as the result of branch circuit 88 having its odd position switches 35 and 45 closed, thereby connecting the energizing circuit means 83 to terminal 36 of the motor. The other branch circuits 39, 91 and 92 are open. Upon a tap change of regulator 11, branch circuit 92 is closed having in series even position switch 34a and odd position switch 44 so that energizing circuit 84 is connected to terminal 37 of motor 41. Then, the completion of a tap change by regulator 12 results in the associated odd position switches being opened and associated even position switches being closed. As a result, branch circuit 89 having two even position switches in series is closed so that motor 31 is operated if the contact making voltmeter continues to call for the load voltage to be reduced. A further operation of motor 31 and regulator 11 results in its associated even position switches being opened and odd position switches being closed whereby branch circuit 91 is completed through an odd position switch of motor 31 and an even position switch of motor 41 to energize motor 41. Another tap change by a step operation of regulator 12 may then be made and return the position switches to the condition illustrated in Fig. 1.

Figure 2:
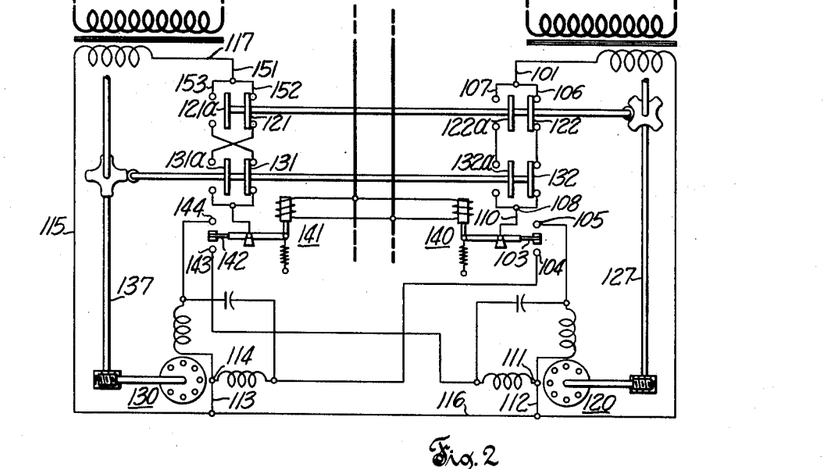
Figure 2 is a schematic diagram of the electrical connections of a modified control circuit embodying the present invention.

Fig. 2 also illustrates an interlock control circuit for operation of at least two motors that may be adapted to run regulators in parallel as shown in Fig. 1. In this embodiment a pair of contact making voltmeters are utilized for operating the two motors, but the number of mechanically operated position switches associated with each of the motors is reduced. The embodiment of Fig. 2 requires only half the number of position switches utilized in the embodiment as presented in Fig. 1. The number of circuit means provided with alternate branches therein having series connected position switches is the same as the number of motors, which means that for just two motors there are only two circuit means of that type. The first of these circuit means 101 has like kinds of position switches in each alternate branch 106 and 107. Branch 106 has in series odd position switches 122 and 132 associated with motors 120 and 130, respectively. Alternate branch 107 has in series even position switches 122a and 132a associated with motors 120 and 130, respectively. The opposite ends of the two alternate branches are connected at 108, and movable contact 103 of contact making voltmeter 140 is connected by conductor 110 to point 108. These energizing circuit means are connected to operate one or the other motor when the contact making voltmeter is in one or the other of its extreme positions. Closed on "raise" contact 105, which also constitutes a terminal of motor 120, movable contact 103 completes the circuit to operate that motor in one direction if position switches of like kind are closed; whereas when closed on "lower" contact 104, movable contact 103 completes the circuit to operate motor 130 in the opposite direction if position switches of like kind are closed. The circuit for motor 120 is completed by conductor 112 connected between terminal 111 of that motor and line 116. Similarly, conductor 113 between terminal 114 and line 116 completes the circuit for motor 130.

For reversing the direction of rotation of these two motors circuit means 151 is provided. This includes a second contact making voltmeter 141, the movable contact 142, of which may close on fixed contact 144 corresponding to the "raise" terminal of motor 130 or may close fixed contact 143 corresponding to "lower" terminal of motor 120. Alternate branch circuits are included in circuit means 151 between line 117 and the movable contact of the contact making voltmeter 141. Each branch has in series an odd position switch of one motor and an even position switch of the other motor. Branch 152 has in series odd position switch 121 of motor 120 and even position switch 131a of motor 130; while branch 153 has in series even position switch 121a of motor 120 and odd position switch 131 of motor 130.

The sequence of operation of the motors illustrated in Fig. 2 is the same as that for the motors illustrated in Fig. 1. The contact making voltmeters respond to the condition of the load circuit. With position switches of like kind closed, circuit 101 is completed through the movable contact of contact making voltmeter 140. If a raise in the load voltage is called for the movable contact is closed on contact 105. Motor 120 then is energized to effect a tap change of its associated regulator (not shown). And the mechanical linkage 127 driven by motor 120 operates the associated position switches, opens the odd position switch in branch circuit 106 and closes the even position switch in branch circuit 107. At the same time motor 120 opens an odd position switch of branch circuit 152 and closes an even position switch of branch circuit 153. Then, assuming that contact making voltmeter 141 continues to call for the voltage to be raised, motor 130 is energized through branch circuit 153 and a tap change is made by the regulator (not shown) associated with motor 130. The operation of motor 130 to effect this step results in its odd position switches opening and its even position switches closing, by mechanical linkage 137, thereby completing branch circuit 107 through two even position switches disposed in series circuit relation. The motors alternately operate in steps closing and opening associated switches so as to continue sequential stepping.

Reversal of direction of operation of the motors is effected by the contact making voltmeters 140 and 141, respectively, closing on terminals 104 and 143 of the motors instead of on terminals 105 and 144. The motor control circuits to step the motors in either direction are the same from sources through the branch circuits to the movable contacts of the contact making voltmeters.

The interlocked motor circuits are so arranged that the motors may be permitted to stop one step apart, as for example, when a single step of only one motor corrects the condition to which the contact making voltmeters respond. Therefore, provision is made in the arrangement of the interlocked motor circuits so that a subsequent reversal of that condition results in the motor last moved being the first to move in the opposite direction, for if the other motor first moves in this opposite direction the motors would then be two steps apart. In the illustrated embodiment of Fig. 2 motor 120 operates in the "raise" direction only if position switches of like kind of the two motors are closed (circuit means 101), that corresponds to both motors being on the same step. Whereas, motor 130 operates in this "raise" direction only if position switches of unlike kind are closed (circuit means 151), corresponding to the motors being on different steps. But to reverse the correction, say to operate a motor in the "lower" direction, the contrary is true. Motor 120 moves in the "lower" direction only if position switches of unlike kind are closed (circuit 151) and motor 130 moves in the "lower"

direction only if position switches of like kind are closed (circuit 101).

Regulators embodying the control circuits of this invention may relatively easily be isolated and operated alone. For the embodiment of Fig. 1, circuit means 63 and 83, respectively, may be disconnected at points 82 and 61 and reconnected at 27 and 28 of voltmeter 26 of regulator 11. Conductor 77 may be disconnected from line 10 and connected to line 29. Either regulator 11 or 12 may then be disconnected from source 17, 18 and load circuit 13, 14. To complete the change for isolated operation the alternate branch circuits may be short circuited.

For the embodiment of Fig. 2, motor terminal connections 104 and 143 at the contact making voltmeters may be interchanged, line 116 opened between the two motors and the branch circuits containing the position switches may be short circuited.

Figure 3:
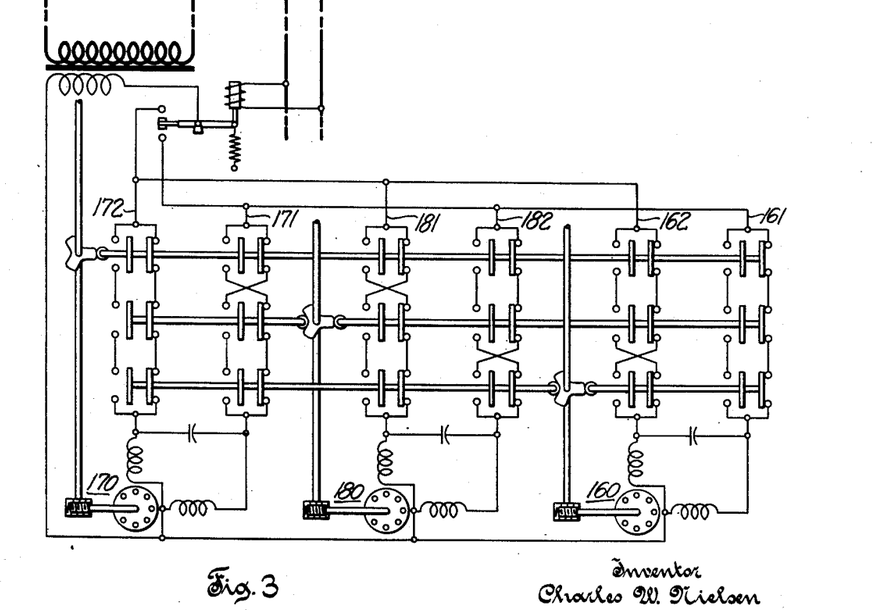
Fig. 3 is a schematic diagram of the electrical connections of a control circuit similar to that of Fig. 1 embodying three interlocked motors.

Fig. 3, which has three motors connected for sequential operation, illustrates how additional motors in any number may be added. An additional position switch for each motor is added to each alternate branch circuit. Motor 160 is energized by circuit means 161 in the "lower" direction if all motors are on the same step, and is energized by circuit means 162 if motor 160 is the only motor on a different step.

Motor 170 is energized in the "lower" direction by circuit means 171 if it is the only motor left to move in that direction, that is only if the other motors have already moved. However, motor 170 is energized in the "raise" direction by circuit means 172 if all the motors are on the same step.

The third motor, 180, is energized to move in the "lower" direction, by circuit means 182, only if motor 160 has moved one more "lower" step than motors 170 and 180, and motor 180 is energized to move in the "raise" direction, by circuit means 181, only if motor 170 has moved one more "raise" step than motors 160 and 180.

To aid in clarifying the drawing, the usual limit switches, starting switches, fuses, etc., in the motor circuit have been omitted.

Although but three embodiments of the present invention have been illustrated and described, it will be apparent to one skilled in the art that various changes and modifications may be made therein without departing from the spirit of the invention or from the scope of the appended claims.

It is claimed and desired to secure by Letters Patent:

1. In a control system for providing step operation of the plurality of reversible motors, in combination, a source of energy, a condition responsive device, a first circuit means between said condition responsive device and a first motor provided to drive said first motor in one direction, a second circuit means between said condition responsive device and said first motor to drive said first motor in the opposite direction, a third circuit means between said condition responsive device and a second motor to drive said second motor in one direction, a fourth circuit means between said condition responsive device and said second motor to drive said second motor in the opposite direction, each of said motors having associated therewith a unit comprising four even position switches, four odd position switches and mechanical means operated by the respective motor to close said four associated even position switches and open said four associated odd position switches when the respective motor is on an even step and to close said four associated odd position switches and to open said four associated even position switches when the respective motor is on an odd step; said first circuit means including in series odd position switches associated with each of said motors, said second circuit means including in series an odd position switch operated by said first motor and an even position switch operated by said second motor, said third circuit means including in series an even position switch operated by said first motor and an odd position switch operated by said second motor, said fourth circuit means including in series even position switches associated with each of said motors, said device being insensitive to condition changes within a certain range thereby having a neutral position whereby said circuits are all open, said device being responsive to a first predetermined change of a condition to electrically connect said first and third circuit means to said source and being responsive to a second predetermined change of a condition to electrically connect said second and fourth circuit means to said source.

2. In a control system for providing step operation of the plurality of reversible motors, in combination, a source of energy, a condition responsive device, a first circuit means connected between said condition responsive device and a first motor provided to drive said first motor in a first direction, a second circuit means between said condition responsive device and said first motor to drive said first motor in the opposite direction, a third circuit means between said condition responsive device and a second motor to drive said second motor in said first direction, a fourth circuit means between said condition responsive device and said second motor to drive said second motor in said opposite direction, each of said motors having associated therewith a unit comprising four even position switches, four odd position switches and means operated by the respective motor to mechanically close said four associated even position switches and open said four associated odd position switches every alternate step of the respective motor and to close said four associated odd position switches and to open said four associated even position switches every intermediate step of the respective motor; said first circuit means including first alternate branch circuits each having in series a said position switch of like kind operated by each of said motors, one of said branches having in series even position switches operated by each of said motors, the other of said branches having in series odd position switches operated by each of said motors, said second circuit means including second alterate branch circuits, one of said second alternate branches having in series a said even position switch operated by said first motor and a said odd position switch operated by said second motor, the other of said second alternate branches having in series a said odd position switch operated by said first motor and a said even position switch operated by said second motor, said third circuit means including third alternate branch circuits, a first of said third alternate branches having in series said even position switch operated by a first of said motors and a said odd position switch operated by said second motor, the second of said third alternate branches having in series a said odd position switch operated by said first motor and a said even position switch operated by said second motor, said fourth circuit means including fourth alternate branch circuits each having in series a said position switch of like kind operated by each of said motors, one of said fourth branches having even position switches operated by each of said motors and the other of said fourth branches having in series odd position switches operated by each of said motors, said device being insensitive to condition changes within a certain range thereby having a neutral position whereby said circuits are all open, said device being responsive to a first predetermined change of a condition to move to a first extreme position to electrically connect said first and third circuit means to said source and being responsive to a second predetermined change of a condition to move to a second extreme position to electrically connect said second and fourth circuit means to said source.

3. In a control system for provinding step operation of the plurality of reversible motors, in combination, a source of energy, a condition responsive device, a first circuit means connected between said condition responsive device and a first motor provided to drive said first motor in a first direction, a second circuit means between said condition responsive device and said first motor to drive said first motor in the opposite direction, a third circuit means between said condition responsive device and a second motor to drive said second motor in said first direction, a fourth circuit means between said condition responsive device and said second motor to drive said second motor in said opposite direction, each of said motors having associated therewith a unit comprising four even position switches, four odd position switches and means operated by the respective motor to mechanically close said four associated even position switches and open said four associated odd position switches every alternate step of the respective motor and to close said four associated odd position switches and to open said four associated even position switches every intermediate step of the respective motor; said first circuit means including first alternate branch circuits each having in series a said position switch of like kind operated by each of said motors, one of said braches having in series even position switches operated by each of said motors, the other of said branches having in series odd position switches operated by each of said motors, said second circuit means including second alternate branch circuits, one of said second alternate branches having in series a said even position switch operated by said first motor and a said odd position switch operated by said second motor, the other of said second alternate branches having in series a said odd position switch by said first motor and a said even position switch operated by said second motor, said third circuit means including third alternate branch circuits, a first of said third alternate branches having in series a said even position switch operated by a first of said motors and a said odd position switch, operated by said second motor, the second of said third alternate branches having in series a said odd position switch operated by said first motor and a said even position switch operated by said second motor, said four circuit means including fourth alternate branch circuits each having in series a said position switch of like kind operated by each of said motors, one of said fourth branches having even position switches operated by each of said motors and the other of said fourth branches having in series odd position switches operated by each of said motors, said device being insensitive to condition changes within a certain range thereby having a neutral position whereby said circuits are all open, said device being responsive to a first predetermined change of a condition to move to a first extreme position to electrically connect said first and third circuit means to said source and being responsive to a second predetermined change of a condition to move to a second extreme position to electrically connect said second and fourth circuit means to said source, said position switches being so disposed in said branch circuits and operated by said motors that said motors alternately operate in single steps and when said device moves from one of its said extreme positions to its other said extreme position the motor last moved in response to said device being in said one extreme position will be first to move in the opposite direction.

4. In a control system for providing step operation of two reversible motors each having associated therewith a plurality of even position switches, a plurality of odd position switches and mechanical means for closing said associated even position switches and opening said associated odd position switches on alternate step operations and opening said associated even position switches and closing said associated odd position switches on intermediate step operations, a source of energy, a first condition responsive device, a second condition responsive device, a first circuit means between one lead of said source and said first condition responsive device including first alternate branch circuits each having in series a position switch of like kind of each said motor, one branch having odd position switches in series and the other said branch having even position switches in series, said first device having a first extreme position completing a circuit to a first of said motors to drive said first motor in a first direction and having a second extreme position completing a circuit to a second of said motors to drive said second motor in the oposite direction, a second circuit means between said source and said second condition responsive device including second alternate branch circuits each having in series a position switch of unlike kind of each said motor, a first of said second alternate branches having in series a said even position switch of said first motor and a said odd position switch of said second motor, the second of said second alternate branches having in series a said odd position switch of said first motor and a said even position switch of said second motor, said second device having a first extreme position completing a circuit to said first motor to drive said first motor in the direction opposite said first direction and having a second extreme position completing a circuit to drive said second motor in said first direction, said position switches being so disposed in said branch circuits and operated by said motors that said motors alternately operate in single steps when said devices are in one of their respective said extreme positions and when said devices move from one of their said extreme positions to their other said extreme position the motor last moved in response to said devices being in said one extreme position will be first moved in the opposite direction in response to said devices being in said other extreme position.

5. In a control system for providing step operation of two reversible motors each having associated therewith a plurality of even position switches, a plurality of odd position switches and mechanical means for closing said associated even position switches and opening said associated odd position switches on alternate step operations and opening said associated even position switches and closing said associated odd position switches on intermediate step operations, a source of energy, a first condition responsive device, a second condition responsive device, a first circuit means between one lead of said source and said first condition responsive device including first alternate branch circuits each having in series a position switch of like kind of each said motor, one branch having odd position switches in series and the other branch having even position switches in series, said first device having a first extreme position completing a circuit to a first of said motors to drive said first motor in a first direction and having a second extreme position completing a circuit to a second of said motors to drive said second motor in the opposite direction, a second circuit means between said source and said second condition responsive device including second alternate branch circuits each having in series a position switch of unlike kind of each said motor, a first of said second alternate branches having in series a said even position switch of said first motor and a said odd position switch of said second motor, the second of said second alternate branches having in series a said odd position switch of said first motor and a said even position switch of said second motor, said second device having a first extreme position completing a circuit to said first motor to drive said first motor in the direction opposite said first direction and having a second extreme position completing a circuit to drive said second motor in said first direction, and means synchronizing the operation of the position switches of said branch circuits that a step operation in a certain direction of either one of said motors results in the completion of a branch circuit in the said circuit means to operate the other of said motors in the same certain direction and the completion of a branch circuit in the said circuit means to operate the said one motor in a direction opposite said certain direction.

6. In a control system for providing step operation of two reversible motors, each having associated therewith a plurality of even position switches, a plurality of odd position switches and mechanical means for closing said associated said even position switches and opening said associated odd position switches on alternate steps and opening said associated even position switches and close said associated odd position switches on immediate steps, a source of energy, a first condition responsive device having a first extreme position, a second extreme position and a neutral position, a second condition responsive device having a first extreme position, a second extreme position and a neutral position, each of said motors having a first circuit means for operating said respective motor in a first direction including one of said devices in its first extreme position and having a second circuit means for operating said respective motor in the opposite direction including one of said devices in its second extreme position, said first circuit means of said first motor and said second circuit means of said second motor including a common energizing circuit having alternate branches, one of said branches having in series a said even position switch of each of said motors, the other of said branches having in series a said odd position switch of each of said motors, said second circuit means of said first motor and said first circuit means of said second motor including a common energizing circuit having alternate branch circuits, one of said branch circuits having in series a said even position switch of said first motor and a said odd position switch of said second motor, the other said branch circuits having in series a said odd position switch of said first motor and a said even position switch of said second motor, said devices being so arranged with respect to said circuit means and said energizing circuit that said devices in their neutral positions prevent either of said motors being energized.

7. In a control system for providing step operation of two reversible motors, each having associated therewith a plurality of even position switches, a plurality of odd position switches and mechanical means for closing said associated said even position switches and opening said associated odd position switches on alternate steps and opening said associated even position switches and closing said associated odd position switches on immediate steps, a source of energy, a first condition responsive device having a first extreme position, a second extreme position and a neutral position; a second condition responsive device having a first extreme position, a second extreme position and a neutral position, each of said motors having a first circuit means for operating said respective motor in a first direction including one of said devices in its first extreme position and having a second circuit means for operating said respective motor in the opposite direction including one of said devices in its second extreme position, said first circuit means of said first motor and said second circuit means of said second motor including a common energizing circuit having alternate branches, one of said branches having in series a said even position switch of each of said motors, the other of said branches having in series a said odd position switch of each of said motors, said second circuit means of said first motor and said first circuit means of said second motor including a common energizing circuit having alternate branch circuits, one of said branch circuits having in series a said even position switch of said first motor and a said odd position switch of said second motor, the other said branch circuits having in series a said odd position switch of said first motor and a said even position switch of said second motor, said devices being so arranged with respect to said circuit means and said energizing circuit that said devices in their neutral positions prevent either of said motors from being energized, said position switches being so disposed in said branch circuits and operated by said motors that said motors alternately operate in single steps when said devices are in one of their respective said extreme positions and when said devices move from one of their said extreme positions to their other said extreme position the motor last moved in response to said devices being in said one extreme position will be first moved in the opposite direction in response to said devices being in said other position.

8. In a control system for providing step operation of two reversible motors, each having associated therewith a plurality of even position switches, a plurality of odd position switches and mechanical means for closing said associated said even position switches and opening said associated odd position switches on alternate steps and opening said associated even position switches and closing said associated odd position switches on immediate steps, a source of energy, a first condition responsive device having a first extreme position, a second extreme position and a neutral position; a second condition responsive device having a first extreme position, a second extreme position and a neutral position, each of said motors having a first circuit means for operating said respective motor in a first direction including one of said devices in its first extreme position and having a second circuit means for operating said respective motor in the opposite direction including one of said devices in its second extreme position, said first circuit means of said first motor and said second circuit means of said second motor including a common energizing circuit having alternate branches, one of said branches having in series a said even position switch of each of said motors, the other of said branches having in series a said odd position switch of each of said motors, said second circuit means of said first motor and said first circuit means of said second motor including a common energizing circuit having alternate branch circuits, one of said branch circuits having in series a said even position switch of said first motor and a said odd position switch of said second motor, the other said branch circuits having in series a said odd position switch of said first motor and a said even position switch of said second motor, said devices being so arranged with respect to said circuit means and said energizing circuit that said devices in their neutral positions prevent either of said motors from being energized, and means synchronizing the operation of the position switches of said branch circuits that a step operation in a certain direction of either one of said motors results in the completion of a branch circuit in the said circuit means to operate the other of said motors in the same certain direction and the completion of a branch circuit in the said circuit means to operate the said one motor in a direction opposite said certain direction.

9. In a control system for providing step operation of two motors, in combination, a source of energy, a first circuit between said source and a first motor to drive said first motor in a first direction when said motors are on the same odd step, a first alternate circuit between said source and said first motor to drive said first motor in said first direction when said motors are on the same even step, a second circuit between said source and said first motor to drive said first motor in the opposite direction when said first motor is on an odd step and said second motor is on an even step, a second alternate circuit between said source and said first motor to drive said first motor in said opposite direction when said first motor is on an even step and said second motor is on an odd step, a third circuit between said source and a second motor to drive said second motor in said first direction when said first motor is on an odd step and said second motor is on an even step, a third alternate circuit between said source and said second motor to drive said second motor in said first direction when said first motor is on an even step and said second motor is on an odd step, a fourth circuit between said source and said second motor to drive said second motor in said opposite direction when said motors are on the same odd step, a fourth alternate circuit between said source and said second motor to drive said second motor in said opposite direction when said motors are on the same even step, each of said motors having associated therewith a unit comprising a plurality of even position switches, a plurality of odd position switches and mechanical means operated by the respective motor to close said associated even position switches and open said associated odd position switches when the respective motor is on an even step and to close said associated odd position switches and to open said associated even position switches when the respective motor is on an odd step, said first circuit and said fourth circuit each including in series odd position switches operated by each of said motors, said second circuit and said third circuit each including in series an odd position switch of one said first motor and an even position switch of said second motor, said first alternate circuit and said fourth alternate circuit each including in series an even position switch of each of said motors, said second alternate circuit and said third alternate circuit each including in series an even position switch of said first motor and an odd position switch of said second motor.

10. In a control system for providing step operation of two motors, in combination, a source of energy, a first circuit between said source and a first motor to drive said first motor in a first direction when said motors are on the same odd step, a first alternate circuit between said source and said first motor to drive said first motor in said first direction when said motors are on the same even step, a second circuit between said source and said first motor to drive said first motor in the opposite direction when said first motor is on an odd step and said second motor is on an even step, a second alternate circuit between said source and said first motor to drive said first motor in said opposite direction when said first motor is on an even step and said second motor is on an odd step, a third circuit between said source and a second motor to drive said second motor in said first direction when said first motor is on an odd step and said second motor is on an even step, a third alternate circuit between said source and said second motor to drive said second motor in said first direction when said first motor is on an even step and said second motor is on an odd step, a fourth circuit between said source and said second motor to drive said second motor in said opposite direction when said motors are on the same odd step, a fourth alternate circuit between said source and said second motor to drive said second motor in said opposite direction when said motors are on the same even step, each of said motors having associated therewith a unit comprising a plurality of even position switches, a plurality of odd position switches and mechanical means operated by the respective motor to close said associated even position switches and open said associated odd position switches when the respective motor is on an even step and to close said associated odd position switches and to open said associated even position switches when the respective motor is on an odd step, said first circuit and said fourth circuit each including in series odd position switches operated by each of said motors, said second circuit and said third circuit each including in series an odd position switch of one said first motor and an even position switch of said second motor, said first alternate circuit and said fourth alternate circuit each including in series an even position switch of each of said motors, said second alternate circuit and said third alternate circuit each including in series an even position switch of said first motor and an odd position switch of said second motor, and condition responsive means having a neutral position, a first extreme position and a second extreme position, said condition responsive means disposed in said circuits to deenergize said circuits when said condition responsive means is in said neutral position, said position switches being so disposed in said circuits and operated by said motors that said motors alternately operate in single steps and when said condition responsive means moves from one of its said extreme positions to the other of its said extreme positions the motor last moved in a certain direction while said means was in said one extreme position will be first to move in a direction opposite said certain direction in response to said means being moved to said other of its extreme positions.

<p align="center">No references cited.</p>